Figure 1:
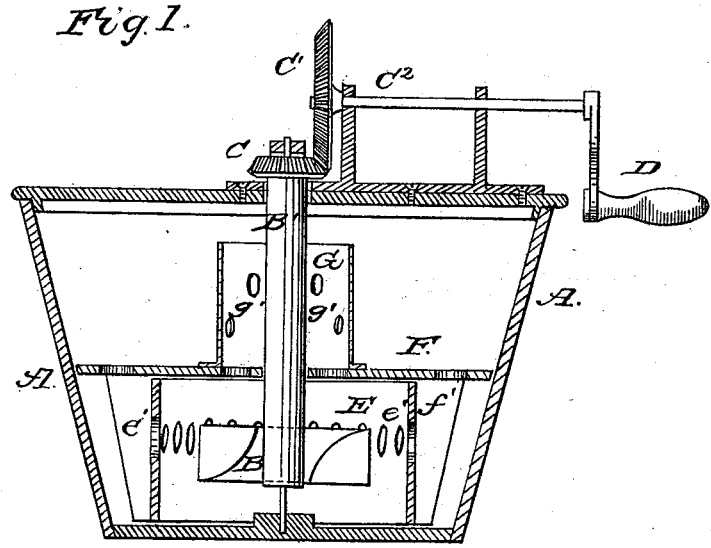
Figure 2:
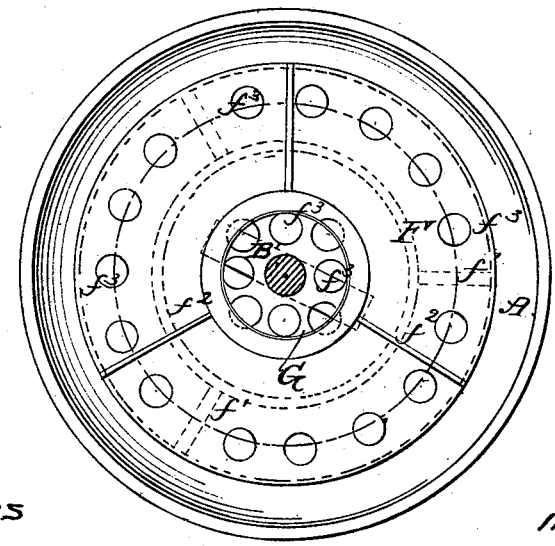

F. RANSOM.
Churn.

No. 44,015.

Patented Aug. 30, 1864.

WITNESSES
Geo M Wallace
E. B. Forbush

INVENTOR
Franklin Ransom

UNITED STATES PATENT OFFICE.

FRANKLIN RANSOM, OF BUFFALO, NEW YORK.

CHURN.

Specification forming part of Letters Patent No. 44,015, dated August 30, 1864.

*To all whom it may concern:*

Be it known that I, FRANKLIN RANSOM, of the city of Buffalo, county of Erie, and State of New York, have invented new and useful Improvements in Churns; and I do hereby declare that the following is a full, clear, and exact description thereof, reference being had to the accompanying drawings, making a part of this specification, in which—

Figure I is a vertical section, and Fig. II is a plan view.

Letters of like name and kind refer to like parts in each of the figures.

The nature of this invention relates, first, to the agitation of the cream or milk by centrifugal force produced by a propeller of a much less diameter than the diameter of the churn-tub—say one-third or one-half the diameter of the churn-tub—in combination with a perforated disk and vacuum-forming drum, (either or both of them,) which form extra rubbing and frictional surfaces against which the cream or milk must impinge or rub in its movements; second, to a ventilating-cylinder placed on the upper side and near the center of the disk and around the propeller-shaft; third, to placing break-wings upon either the upper or lower side of the disk in order to prevent the cream from obtaining a free rotary motion, and to direct it to the center again.

A represents the churn tub, which may be made of any required size or form.

B is the propeller, and B' propeller-shaft, and C, C', C², and D appropriate and common gearing, shaft, and crank, for giving motion to the propeller. The propeller describes a circle of much less diameter, comparatively, as it revolves than the diameter of the churn-tub, so as to throw the cream centrifugally with great velocity through the perforations in the drum and disk.

E is a movable or hollow drum, open at both ends, and placed centrally on the bottom of the churn-tub and around the propeller. It is a little larger in diameter than the propeller and of less diameter than the churn-tub. It has numerous holes made through its body, as shown at $e'$. The action of the propeller forces the cream outwardly through these holes and upwardly through the perforations in the disk.

F is a perforated disk of equal diameter to the inside diameter of the churn-tub. It is placed inside of the churn-tub and in contact with the drum E. Catch-wings or breakers $f$ in Fig. II may be connected to the bottom of the disk, radiating from the drum to the churn-tub, and dividing the annular space between said drum and churn-tub, which will operate to break and retard a rotary motion of the cream. There are also wings projecting upwardly from the upper side of the disk, as shown at $f^2$, which serve as breaks, to obstruct a free rotary motion of the cream or milk on the upper side of the disk, and give it direction back to the center. $f^3$ are holes through the disk.

G represents a hollow cylinder, open at both ends, and perforated at the sides, as shown at $g'$. This cylinder is set upon the upper side of the disk and surrounds the propeller-shaft, as shown in the drawings. This device need not be used when there is but a small quantity of cream in the churn; but when there is a large quantity, sufficient to submerge the disk F, it serves the purpose of drawing air into the cream, and produces a greater vacuum-space around the propeller, which causes currents of cream to rush in through the holes, and thence downwardly through the central holes in the disk to the propeller, to be driven outwardly again by the propeller through the openings in the lower drum and upwardly through the outer holes in the disk. Thus, by this movement from the center outwardly, and from the periphery inwardly, to the center again, the cream is kept constantly agitated, penetrated with air, and forced with great velocity against the frictional perforated surfaces of the drum, cylinder, and disk, and the churning is accomplished with a slight comparative expenditure of power, and quickly and successfully.

What I claim as my invention, and desire to secure by Letters Patent, is—

1. The application and use of rotating blades or propeller B, of much less diameter than the diameter of the churn-tub, in combination with the perforated disk F and hollow cylinder E, (either or both of them,) for the purposes and substantially as herein described.

2. The perforated cylinder G, in combination with the disk F and propeller B, for the purposes and substantially as herein set forth.

3. The break-wings $f'$ $f^2$, placed either upon the upper or lower side of the disk, for the purposes and substantially as set forth.

FRANKLIN RANSOM.

Witnesses:
 GEO. W. WALLACE,
 E. B. FORBUSH.